United States Patent
Um et al.

(10) Patent No.: US 7,834,945 B2
(45) Date of Patent: Nov. 16, 2010

(54) THIN FILM TRANSISTOR ARRAY SUBSTRATE HAVING A SECOND PIXEL ELECTRODE CAPACITIVELY COUPLED TO A FIRST PIXEL ELECTRODE

(75) Inventors: Yoon-Sung Um, Yongin-si (KR); Jae-Jin Lyu, Gyeonggi-do (KR); Chang-Hun Lee, Yongin-si (KR); Mee-Hye Jung, Hwasung-si (KR)

(73) Assignee: Samsung Electronics Co., Ltd. (KR)

( * ) Notice: Subject to any disclaimer, the term of this patent is extended or adjusted under 35 U.S.C. 154(b) by 46 days.

(21) Appl. No.: 11/175,254

(22) Filed: Jul. 7, 2005

(65) Prior Publication Data

US 2006/0023134 A1 Feb. 2, 2006

(30) Foreign Application Priority Data

Jul. 7, 2004 (KR) .................. 10-2004-0052565
Jul. 9, 2004 (KR) .................. 10-2004-0053395

(51) Int. Cl.
*G02F 1/1343* (2006.01)
*G02F 1/1345* (2006.01)

(52) U.S. Cl. ....................... 349/38; 349/144
(58) Field of Classification Search .............. 349/38, 349/144
See application file for complete search history.

(56) References Cited

U.S. PATENT DOCUMENTS

| 6,028,577 | A | | 2/2000 | Sakamoto | |
|---|---|---|---|---|---|
| 6,066,536 | A | * | 5/2000 | Lin | 438/379 |
| 6,088,071 | A | * | 7/2000 | Yamamoto et al. | 349/38 |
| 6,400,424 | B1 | * | 6/2002 | Kim et al. | 349/38 |
| 6,665,045 | B2 | * | 12/2003 | Kanayama | 349/192 |
| 7,046,323 | B2 | * | 5/2006 | Kim et al. | 349/129 |
| 2001/0040648 | A1 | * | 11/2001 | Ono et al. | 349/43 |
| 2002/0036724 | A1 | * | 3/2002 | Ha | 349/38 |
| 2002/0070197 | A1 | * | 6/2002 | Ahn et al. | 216/13 |
| 2002/0070719 | A1 | * | 6/2002 | Amarillas et al. | 323/282 |
| 2002/0093614 | A1 | * | 7/2002 | Moon et al. | 349/141 |
| 2002/0109813 | A1 | * | 8/2002 | Yu et al. | 349/141 |
| 2003/0133055 | A1 | * | 7/2003 | Um et al. | 349/43 |
| 2004/0070713 | A1 | * | 4/2004 | Song | 349/129 |
| 2004/0125253 | A1 | | 7/2004 | Kim et al. | |
| 2004/0135147 | A1 | * | 7/2004 | Kim et al. | 257/59 |
| 2004/0195573 | A1 | * | 10/2004 | Kim | 257/72 |
| 2005/0030460 | A1 | * | 2/2005 | Kim et al. | 349/139 |
| 2006/0102903 | A1 | * | 5/2006 | Kim et al. | 257/72 |
| 2006/0145981 | A1 | * | 7/2006 | Lee et al. | 345/89 |

FOREIGN PATENT DOCUMENTS

| CN | 1495473 | 5/2004 |
|---|---|---|
| JP | 2004038165 | 2/2004 |
| WO | 03044595 | 5/2003 |
| WO | 2004029709 | 4/2004 |

* cited by examiner

*Primary Examiner*—David Nelms
*Assistant Examiner*—Lauren Nguyen
(74) *Attorney, Agent, or Firm*—Cantor Colburn LLP

(57) ABSTRACT

A first pixel electrode and a second pixel are formed in a pixel area. The first pixel electrode is coupled to the second pixel electrode via a coupling capacitance. A voltage is applied to the second pixel electrode from the first pixel electrode through the coupling capacitance. Therefore the voltage applied to the second pixel electrode depends on the voltage applied to the first pixel electrode and the two voltages have a certain ratio. Applying two different voltages in a pixel area can improve display quality.

5 Claims, 22 Drawing Sheets

V2  V1

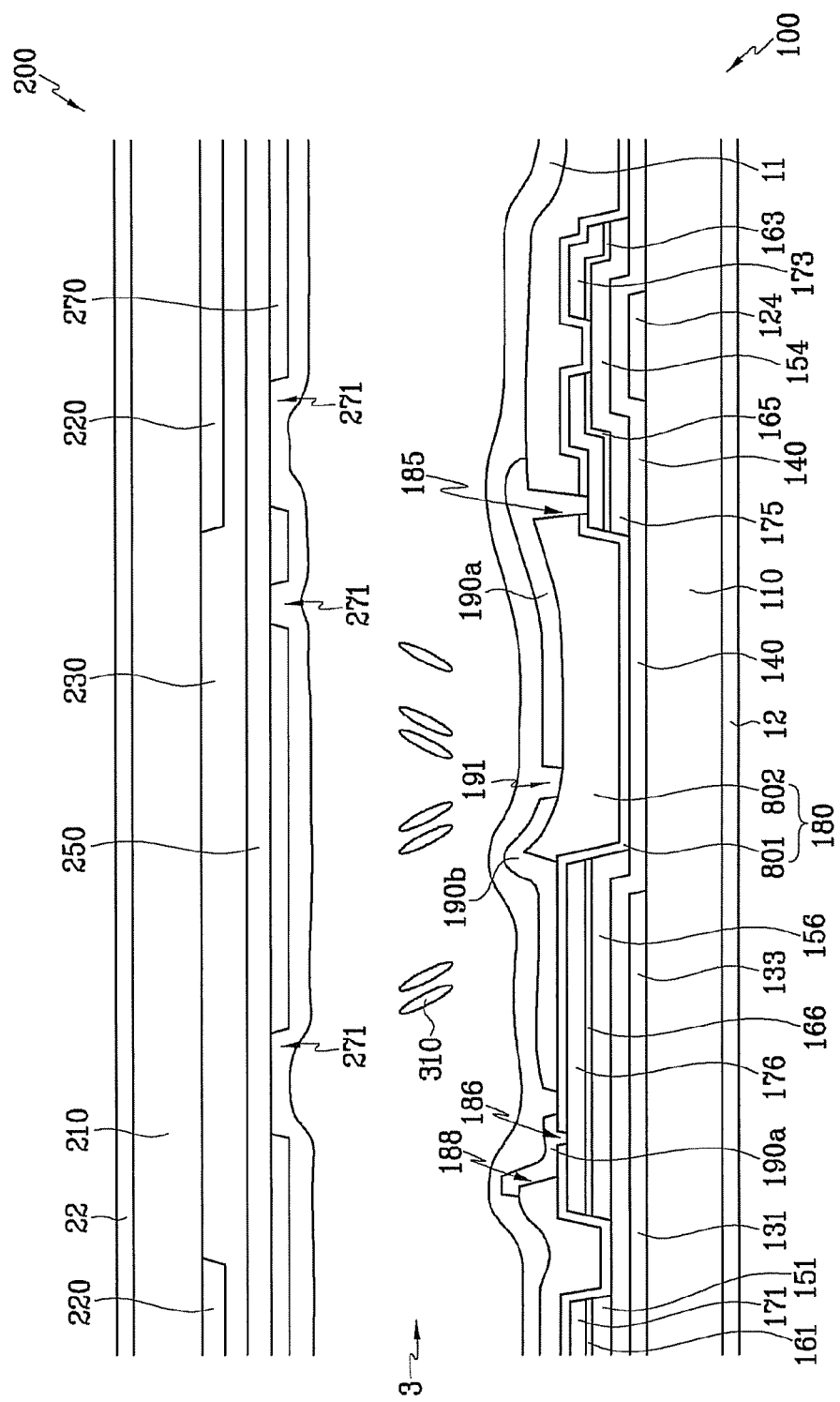

THIN FILM TRANSISTOR ARRAY SUBSTRATE HAVING A SECOND PIXEL ELECTRODE CAPACITIVELY COUPLED TO A FIRST PIXEL ELECTRODE

CROSS REFERENCE TO RELATED APPLICATION

This application claims priority to and the benefit of Korean Patent Applications No. 2004-052565, filed on Jul. 7, 2004 and No. 2004-053395, filed on Jul. 9, 2004, which are hereby incorporated by reference for all purposes as if fully set forth herein.

BACKGROUND OF THE INVENTION

1. Field of the Invention

The present invention relates to a liquid crystal display (LCD), an array substrate characterizing wide viewing angle, and a manufacturing method of the array substrate and the LCD.

2. Discussion of the Background

A liquid crystal display (LCD) comprises a lower substrate, an upper substrate and a liquid crystal layer inserted between the upper substrate and the lower substrate. A pixel electrode is formed on the lower substrate. The upper substrate may comprise a common electrode and a color filter layer. The LCD displays images by applying electric field to the liquid crystal (LC) layer and by controlling light intensity transmitting through the device.

Traditional LCDs have narrow viewing angle compared to other displays like cathode ray tube (CRT) or plasma display panel (PDP). A vertically aligned (VA) LCD is strongly recommended to get a wide viewing angle.

One type of the VA LCD has opening patterns in the common electrode and the pixel electrode. The opening patterns induce fringe fields when an electric field is applied between the common electrode and the pixel electrode. The fringe field defines tilt directions of the liquid crystal molecules. Another type of VA LCD has protrusions formed on the common electrode and the pixel electrode. The protrusions can define the tilt direction of the LC molecules. Another type of VA LCD has protrusions on the common electrode and openings in the pixel electrode. An LCD can have wide viewing angle by forming multi tilt directions of the LC molecules. Multi domains formed by multi tilt directions of the LC molecules can realize a wide viewing angle of an LCD in view of a contrast ratio and a gray inversion.

Unfortunately, the front view gamma curve of the VA LCD is different from an oblique view gamma curve. The differences among gamma curves induce image degradation because the image shown in the front is different from the image shown in an oblique direction.

SUMMARY OF THE INVENTION

An embodiment of the present invention provides a multi domain LCD enhancing display quality.

Another embodiment of the present invention provides a method for manufacturing the above mentioned LCD.

An embodiment of the present invention discloses a thin film transistor (TFT) array substrate. The TFT array substrate has first signal lines and second signal lines formed on an insulation substrate. A pixel area is defined by the first signal lines and the second signal lines. A first pixel electrode is formed in the pixel area. A TFT is formed in the pixel area. The TFT is electrically coupled to a first signal line, to a second signal line, and the first pixel electrode. A coupling electrode is formed in the pixel area. The coupling electrode is electrically coupled to the first pixel electrode by a contact hole. A second pixel electrode is formed in the pixel area. The second pixel electrode is electrically coupled to the coupling electrode via a capacitor.

An insulation layer is formed between the coupling electrode and the second pixel electrode. The insulation layer formed between the coupling electrode and the second pixel electrode may be thinner than the other area of the insulation layer. A storage electrode is formed in the pixel area. The storage electrode forms a storage capacitor with the coupling electrode and an insulation layer formed between the coupling electrode and the storage electrode. The coupling electrode may cover the whole storage electrode in a plan view. A first passivation layer and a second passivation layer may be formed on the array substrate. The first passivation layer may be made of an inorganic insulator. The second passivation layer may be made of an organic insulator.

The first pixel electrode or the second pixel electrode may have an element dividing LC layer into two domains or more. The first and the second pixel electrodes may be symmetry about a horizontal reference line bisecting the pixel area.

An embodiment of the present invention also discloses an LCD, comprising: a first insulation plate; a gate line and a gate electrode formed on the insulation plate; a gate insulation layer formed on the gate electrode and the gate line; an amorphous silicon pattern formed on the gate insulation layer; a source electrode, a drain electrode and a data line, wherein at least a portion of the source electrode and at least a portion of the drain electrode is formed on the amorphous silicon pattern. The source electrode is connected to the data line.

A coupling electrode is formed on the gate insulation layer. A passivation layer is formed on the data line, the source electrode, the drain electrode and the coupling electrode wherein the passivation layer on the coupling electrode may be thinner than the other area of the passivation layer. A first pixel electrode is formed on the passivation layer. The first pixel electrode is electrically coupled to the drain electrode and to the coupling electrode. A second pixel electrode is formed on the passivation layer. The second pixel electrode overlaps the coupling electrode and electromagnetically coupled to the coupling electrode.

A second insulation substrate opposing the first insulation substrate has a first element dividing LC domains. The pixel electrode has a second element dividing LC domains. The first element and the second element may be openings in the electrodes or protrusions on the electrodes.

It is to be understood that both the foregoing general description and the following detailed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 19 shows a cross sectional view of XIII-XIII' of FIG. 18.

DETAILED DESCRIPTION OF THE ILLUSTRATED EMBODIMENTS

Figure 1:
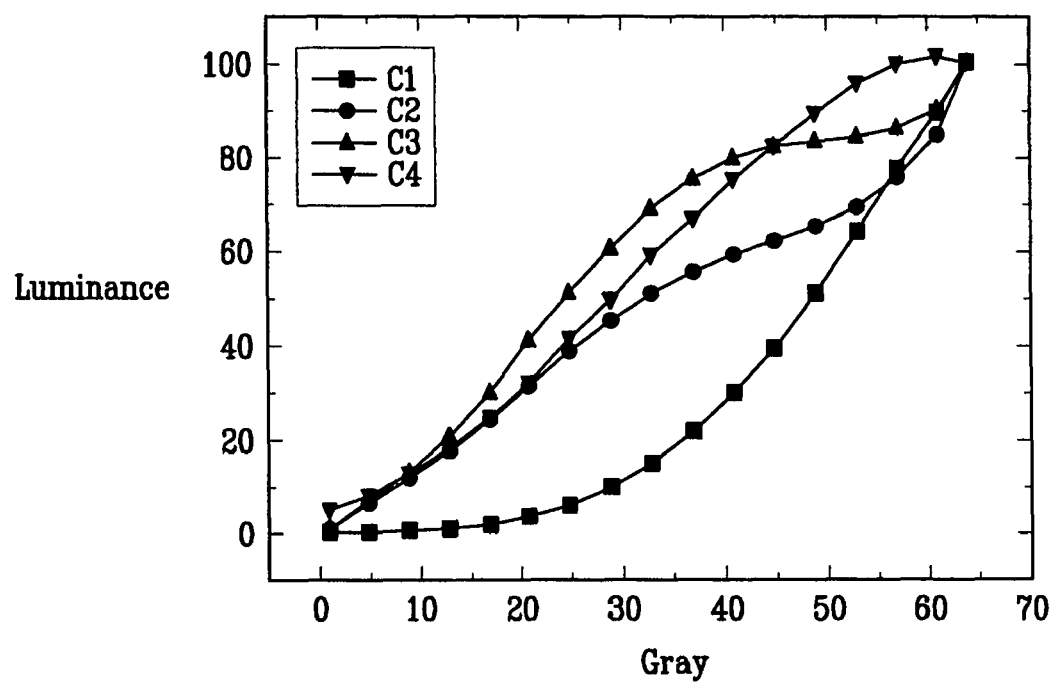
FIG. 1 shows gamma curves of a prior art VA-mode LCD.

FIG. 1 shows gamma curves of a prior art VA LCD. C1 is a front view gamma curve. C2 is an upper view gamma curve. C3 is a right side view gamma curve. C4 is a diagonal view gamma curve. C2, C3 and C4 are deviated a lot from C1, which means that the brightness of an inclined view is a lot different from the front view. Furthermore, C2, C3 and C4 changes slowly in their bright gray range, which means that images are not clear in the bright gray range.

Figure 2A:
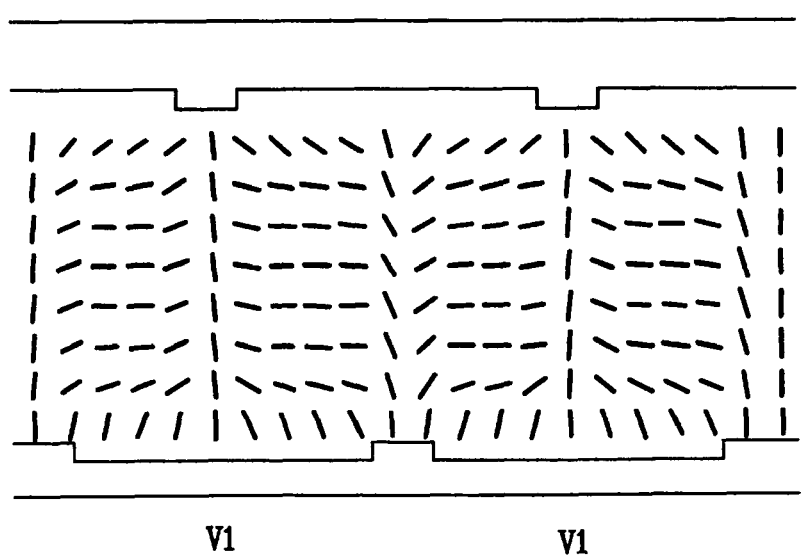
FIG. 2A shows an arrangement of LC molecules in a multi domain LCD.
Figure 4A:
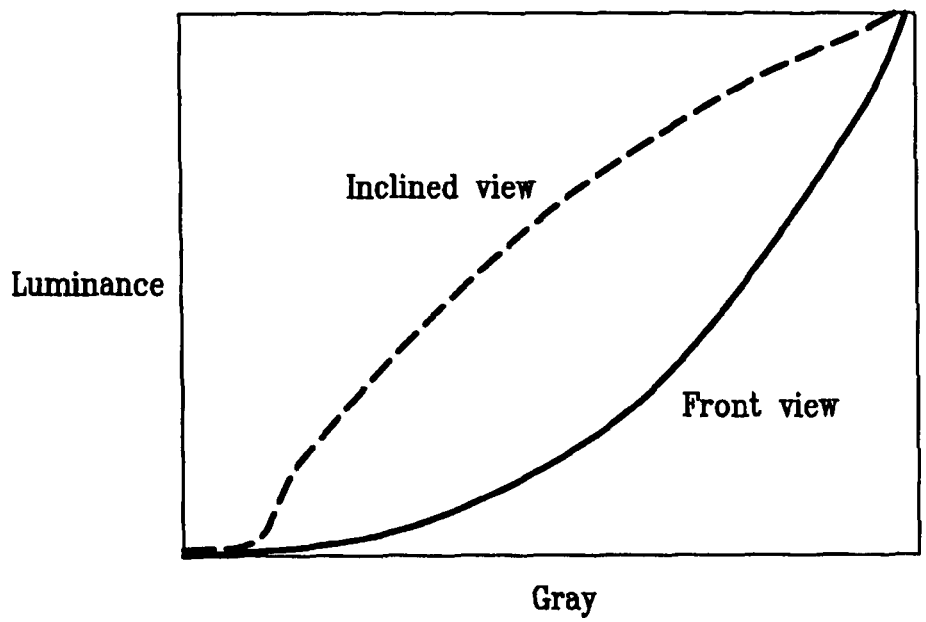
FIG. 4A shows the front view gamma curve and the inclined view gamma curve of the LCD of FIG. 2A.

As shown in FIGS. 2a and 4a, even one pixel has a plurality of LC domains. This makes a gamma curve viewed from inclined angles deviate much from the front view gamma curve if the voltage is same through the whole pixel area.

Figure 2B:
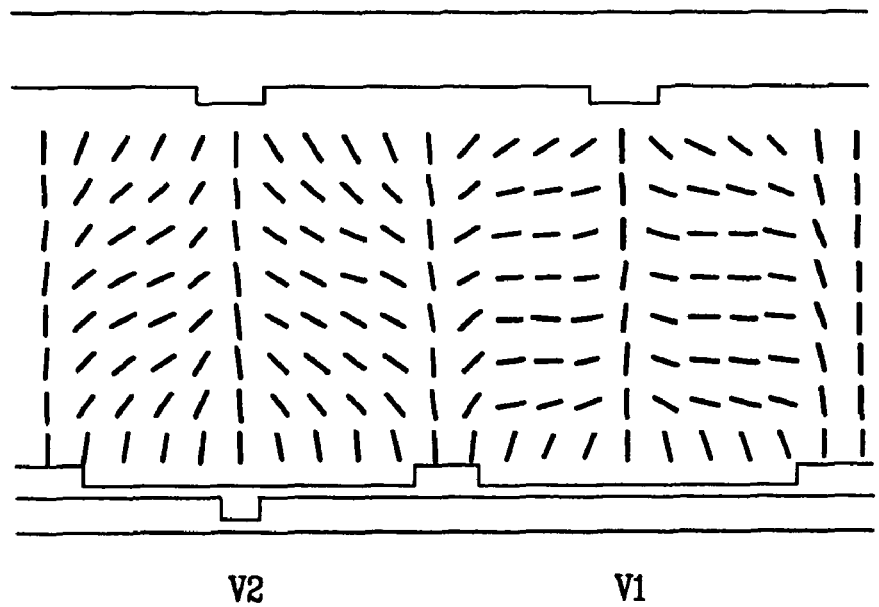
FIG. 2B shows an arrangement of LC molecules when two different voltages are applied respectively to two sub pixels in an LCD.
Figure 3:
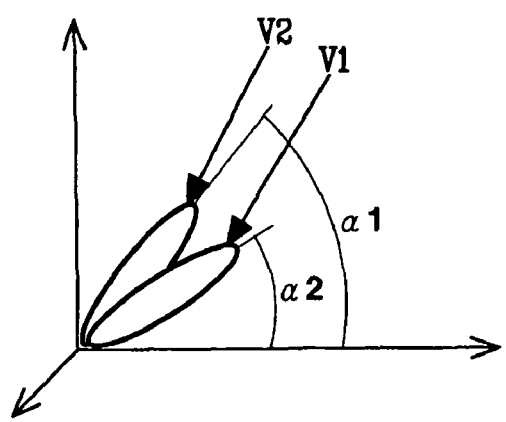
FIG. 3 shows tilt angle of the LC molecules of FIG. 2B.
Figure 4B:
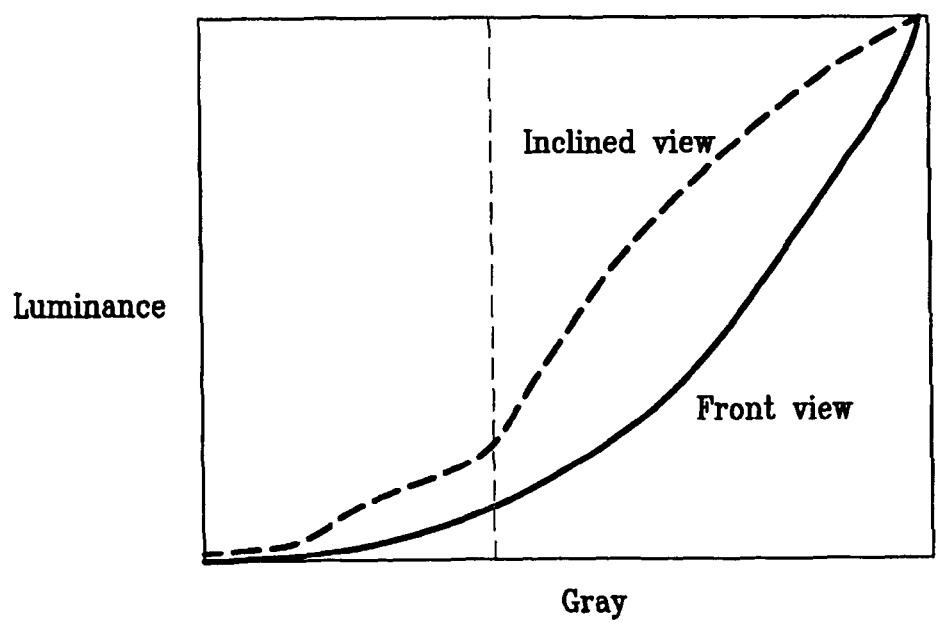
FIG. 4B shows the front view gamma curve and the inclined view gamma curve of the LCD of FIG. 2B.
Figure 5:
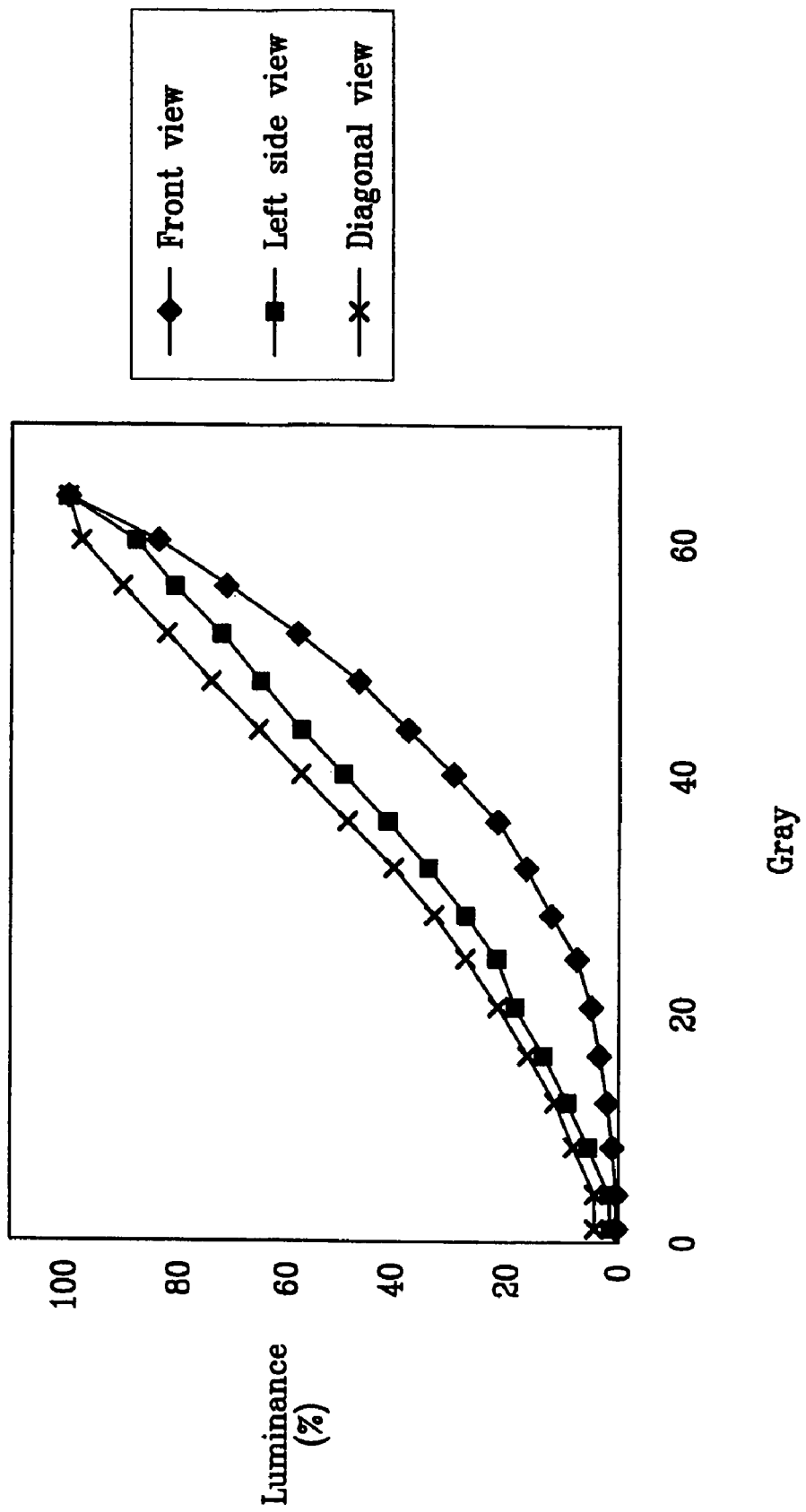
FIG. 5 shows gamma curves of an embodiment of the present invention.

FIGS. 2b and 4b show that the pixel area is divided into two sub-pixels. The voltages applied to the sub-pixels are different from each other at a certain ratio. The LC molecules in one sub-pixel incline to a different angle from the angle that the LC molecules in the other sub pixel incline. The gamma curves in FIG. 4b show that the deviation is smaller than those of FIG. 4a.

As shown in FIGS. 7, 8, 9 and 10, an LCD comprises a TFT array substrate 100, an upper substrate 200 opposing to the array substrate 100 and an LC layer 3 including LC molecules 310 that is aligned vertically to the array substrate 100 and the upper substrate 200. Alignment layers 11 and 21 are formed on the inner sides of the array substrate 100 and the upper substrate 200 respectively. The alignment layers 11 and 21 may be a vertical alignment layer aligning LC molecules vertically to the surface. Polarizers 12 and 22 are attached on the outer surfaces of the array substrate 100 and the upper substrate 200 respectively.

The TFT array substrate 100 comprises an insulation plate 110. A plurality of gate lines 121 are formed on the insulation plate 110. The gate lines 121 extend transversally. A portion of each gate line forms a plurality of gate electrodes 124. The gate electrodes 124 may protrude from the gate lines 121. A gate line 121 may have a contact area that is wider than the other portion and may contact to an outer circuit. A gate line 121 may be connected to a gate driving circuit that is formed on the array substrate 110. A storage electrode line 131 may be formed on the same layer to the gate line 121. The storage electrode line has a plurality of storage electrode 133. The storage electrode 133 may be wider than the storage electrode line 131.

The gate line 121 and the storage electrode line 131 are made of metal like aluminum (Al), aluminum alloy (Al alloy), silver (Ag), silver alloy (Ag alloy), chromium (Cr), titanium (Ti), tantalum (Ta), molybdenum (Mo) etc. The gate line 121 and the storage electrode line 131 may be formed with single layer or double layer. One layer of the double layer may be made of a material that has a good mechanical endurance and chemical resistance like Cr, Mo, Ti, Ta, etc. The other layer of the double layer may be made of a good conductive material like Al, Al alloy, etc. The sides of the gate line 121 and the storage electrode line 131 taper with an angle ranging between 30° and 80° with respect to the surface of the insulation plate 110, which makes easier for upper layers to run over.

A gate insulation layer 140 is formed on the gate line 121 and the storage electrode line 131. The gate insulation layer 140 is made of silicon nitride ($SiN_x$) or silicon oxide ($SiO_x$). A plurality of data line 171 and a plurality of drain electrode 175 are formed on the gate insulation layer 140. The data lines 171 extend longitudinally. Each data line 171 has a plurality of source electrode 173 extending from the data line 171 and having a basin toward the drain electrode 175. One end of the data line 171 has a contact area 179 that is wider than the other portion and contacts with outer circuit.

A coupling electrode 176 is formed on the gate insulation layer 140. The coupling electrode 176 overlaps the storage electrode 133 and forms a capacitor along with the gate insulation layer 140. It is good for getting high aperture ratio that the coupling electrode 176 overlaps with the storage electrode 133. The coupling electrode 176 may be apart from the drain electrode 175 or may be connected to the drain electrode 175 directly in the same layer. The boundary of the storage electrode 133 may stand within the boundary of the coupling electrode 176 in a plan view. The boundary of the storage electrode 133 may stand outside of the boundary of the coupling electrode 176 in a plan view.

The data line 171, the drain electrode 175, and the coupling electrode 176 may be made of a metal like aluminum (Al), aluminum alloy (Al alloy), silver (Ag), silver alloy (Ag alloy), chromium (Cr), titanium (Ti), tantalum (Ta), molybdenum (Mo), molybdenum alloy (Mo alloy) etc. The data line 171, the drain electrode 175, and the coupling electrode 176 may be is formed with multi layers of the above metals for example Mo/Al alloy/Mo or Cr/Al.

A semiconductor layer 151 is formed under the data line 171 and the drain electrode 175. The semiconductor layer extends toward the gate electrode and forms a channel area of a TFT. The semiconductor layer may be made of amorphous silicon. An ohmic contact line 161 is formed between the data line 171 and the semiconductor layer 151. An ohmic contact island 165 is formed between the drain electrode 175 and the semiconductor layer 151. An ohmic contact layer may reduce contact resistance between a metal layer and a semiconductor layer 154. The ohmic contact layers 161, 163 and 165 may be made of a silicide or an n-type extrinsic amorphous silicon.

A passivation layer 180 is formed on the drain electrode 175 and the data line 171. The passivation layer 180 may be made of an organic photo resist, a low dielectric material, or silicon nitride ($SiN_x$). The low dielectric material may be formed by plasma enhanced chemical vapor deposition (PECVD). The low dielectric material may be a-Si:C:O or a-Si:O:F. The passivation layer 180 may be formed in two layers. The first layer 801 may be made of silicon nitride or silicon oxide. The second layer 802 may be made of an organic insulation material. The second layer 802 may be made of a color filter.

Contact holes 182 and 185 are formed in the passivation layer 180. The contact hole 182 exposes an end of the data line. The contact hole 185 exposes a portion of the drain electrode 175. A contact hole 181 exposing an end portion of the gate line 121 is formed through the gate insulation layer 140 and the passivation layer 180. A contact hole 186 exposing a portion of the coupling electrode 176 is formed in the passivation layer 180. An opening area 188 exposing the first passivation layer 801 is formed in the second passivation layer 802.

Pixel electrodes are formed on the passivation layer 180. Contact assistants 81 and 82 are formed on the passivation layer 180. The pixel electrodes and the contact assistants are made of a transparent conductor like indium tin oxide (ITO), indium zinc oxide (IZO), etc. The pixel electrodes and the contact assistants may be made of an opaque metal like Al, Cr, etc that reflects light well. Each pixel electrode comprises a first pixel electrode 190a and a second pixel electrode 190b divided each other by an opening area. The first pixel electrode 190a is coupled to the drain electrode 175 through the contact hole 185. The first pixel electrode 190a is also coupled to the coupling electrode 176 through the contact hole 186. The second pixel electrode 190b overlaps the coupling electrode 176. Therefore a coupling capacitance $C_{cp}$ is formed by the coupling electrode 176, the second pixel electrode 190b, and a first passivation layer 801. The second pixel electrode 190b is electromagnetically coupled to the first pixel electrode 190a via the coupling capacitance $C_{cp}$. Because the coupling capacitance $C_{cp}$ does not include a second passivation layer 802, the coupling capacitance $C_{cp}$ may be big enough even though the coupling electrode 176 is small enough that may lead higher aperture ratio of the display.

The opening area dividing the first pixel electrode 190a and the second pixel electrode 190b is divided into two portions. The first portion forms an angle of about 45 degrees with the gate line 121. The second portion forms an angle of about 90 degrees with the gate line 121. The first portion is divided into two parts 191 and 193. The first portion is longer than the second portion of the opening area. The one part 191 forms an angle of about 90 degrees with the other part 193.

The second pixel electrode 190b has an opening area 192. The opening area 192 is opened from the right side of the second pixel electrode 190b. The right side of the opening area 192 is wider than the other portion of the opening area 192. A pixel area is defined by a pair of gate lines 121 and a pair of the data lines 171. The first pixel electrode 190a and the second pixel electrode 190b are symmetry with respect to an imaginary line bisecting the pixel area. The imaginary line is parallel to the gate line 121. The contact assistant 81 is coupled to an end of the gate line 121 through the contact hole 181. The contact assistant 82 is coupled to an end of the data line 171 through the contact hole 182.

Figure 6:
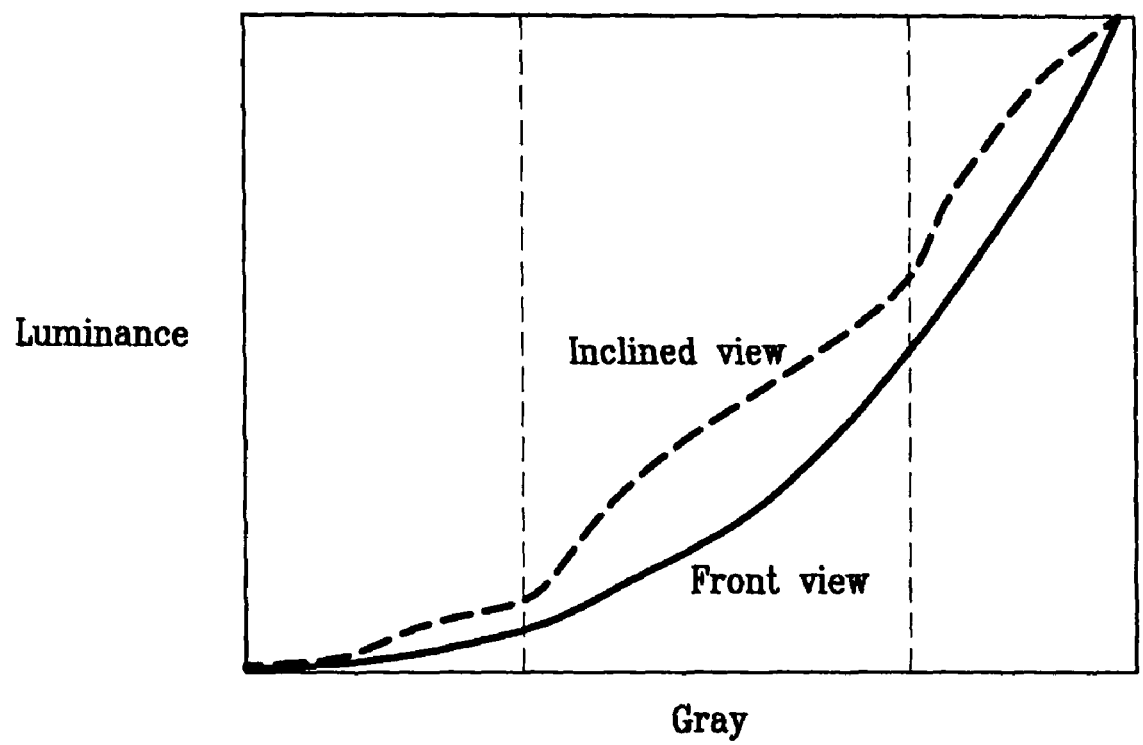
FIG. 6 shows gamma curves of an LCD that has three sub pixels in a pixel area, wherein the voltages applied to the three sub pixels are different from each other.
Figure 7:
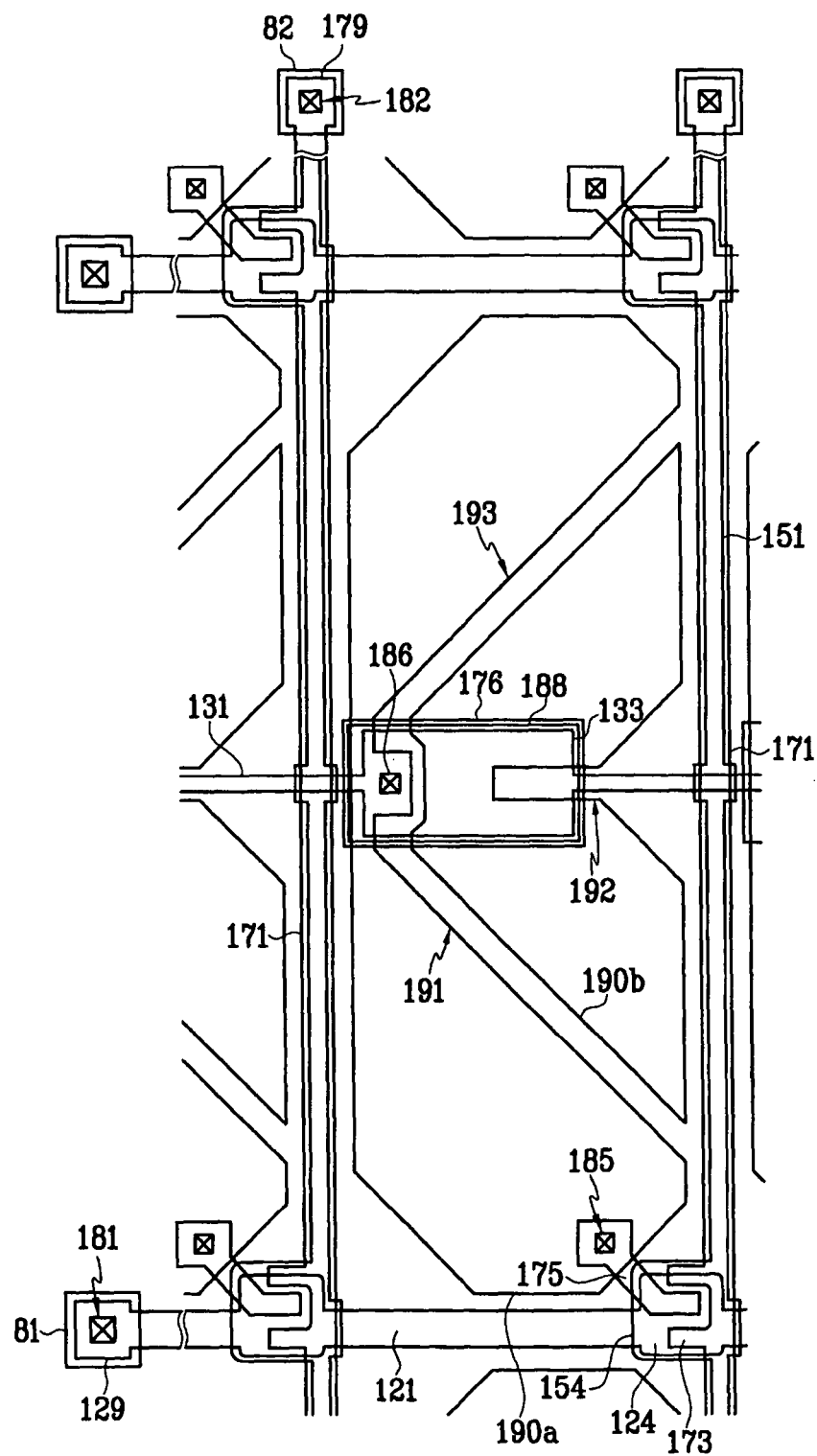
FIG. 7 shows a plan view of the TFT array substrate of one embodiment of the present invention.
Figure 8:
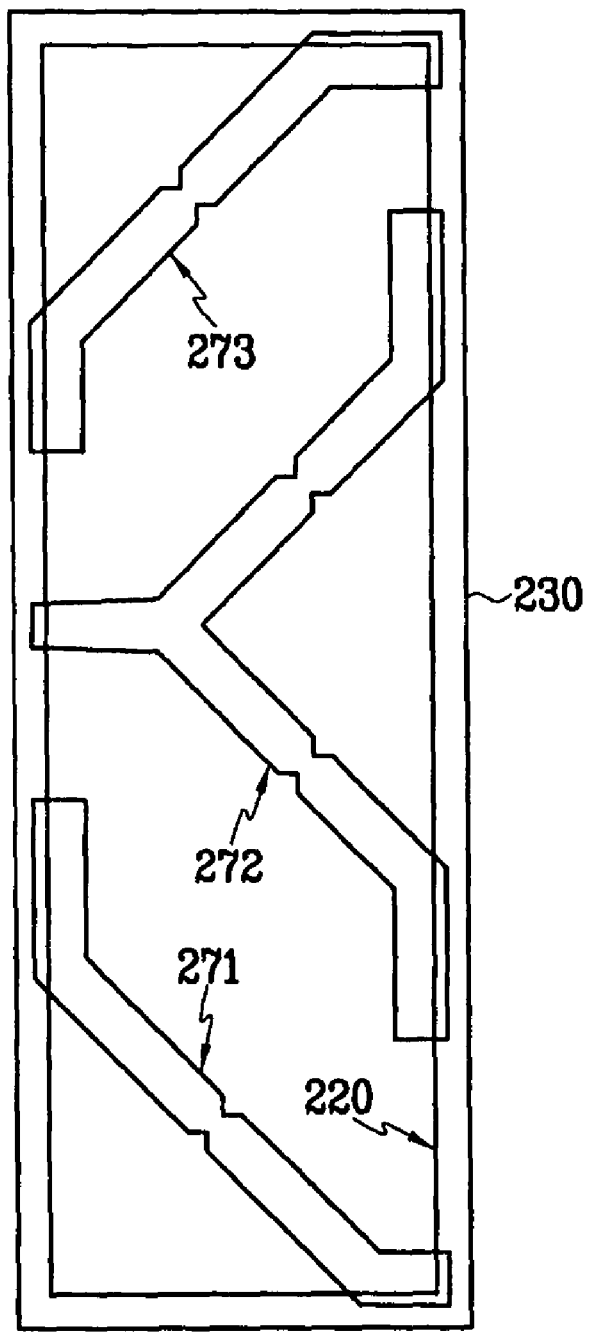
FIG. 8 shows a plan view of the upper substrate of an embodiment of the present invention.
Figure 9:
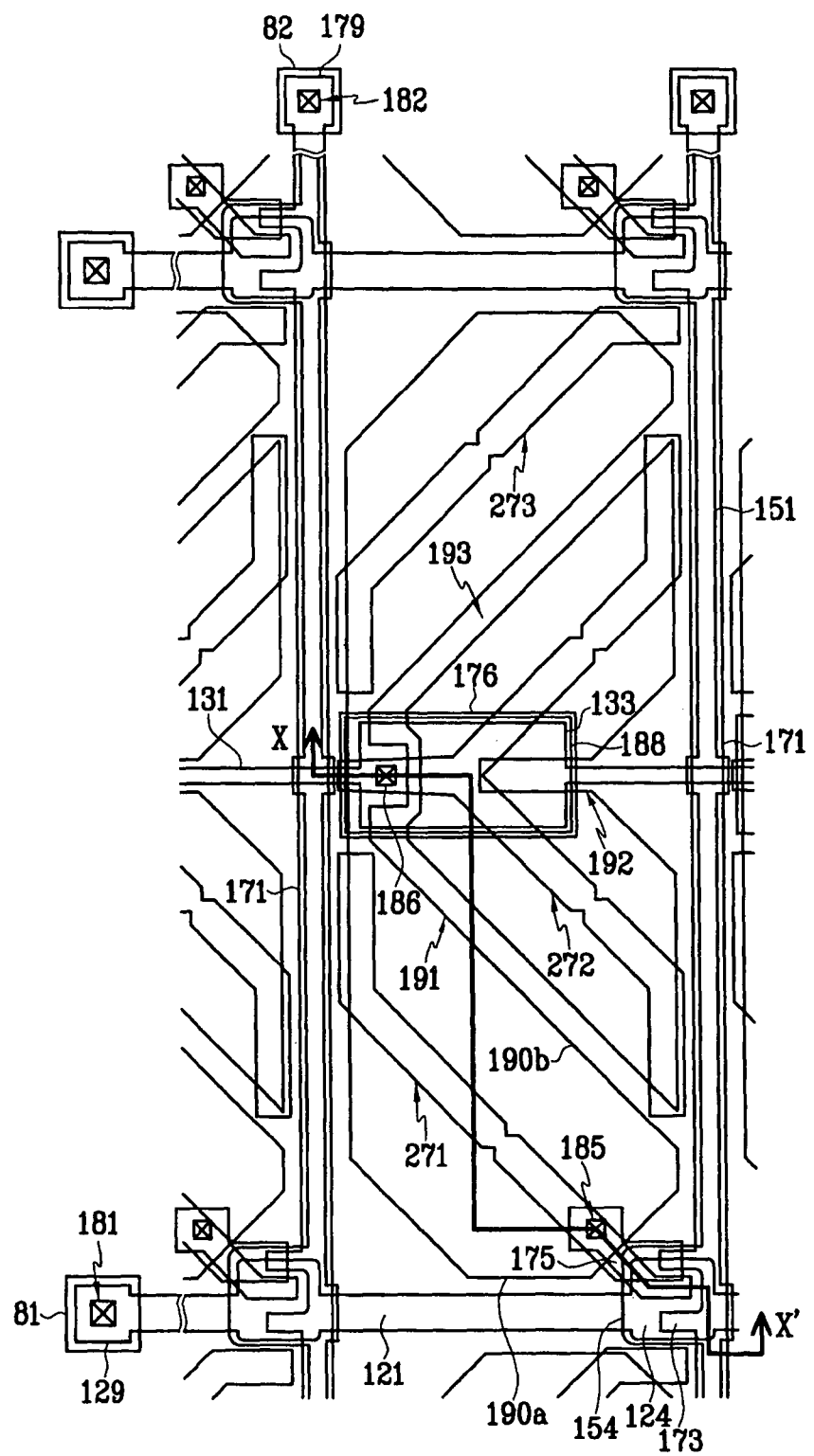
FIG. 9 shows a plan view of an LCD of another embodiment of the present invention.
Figure 10:
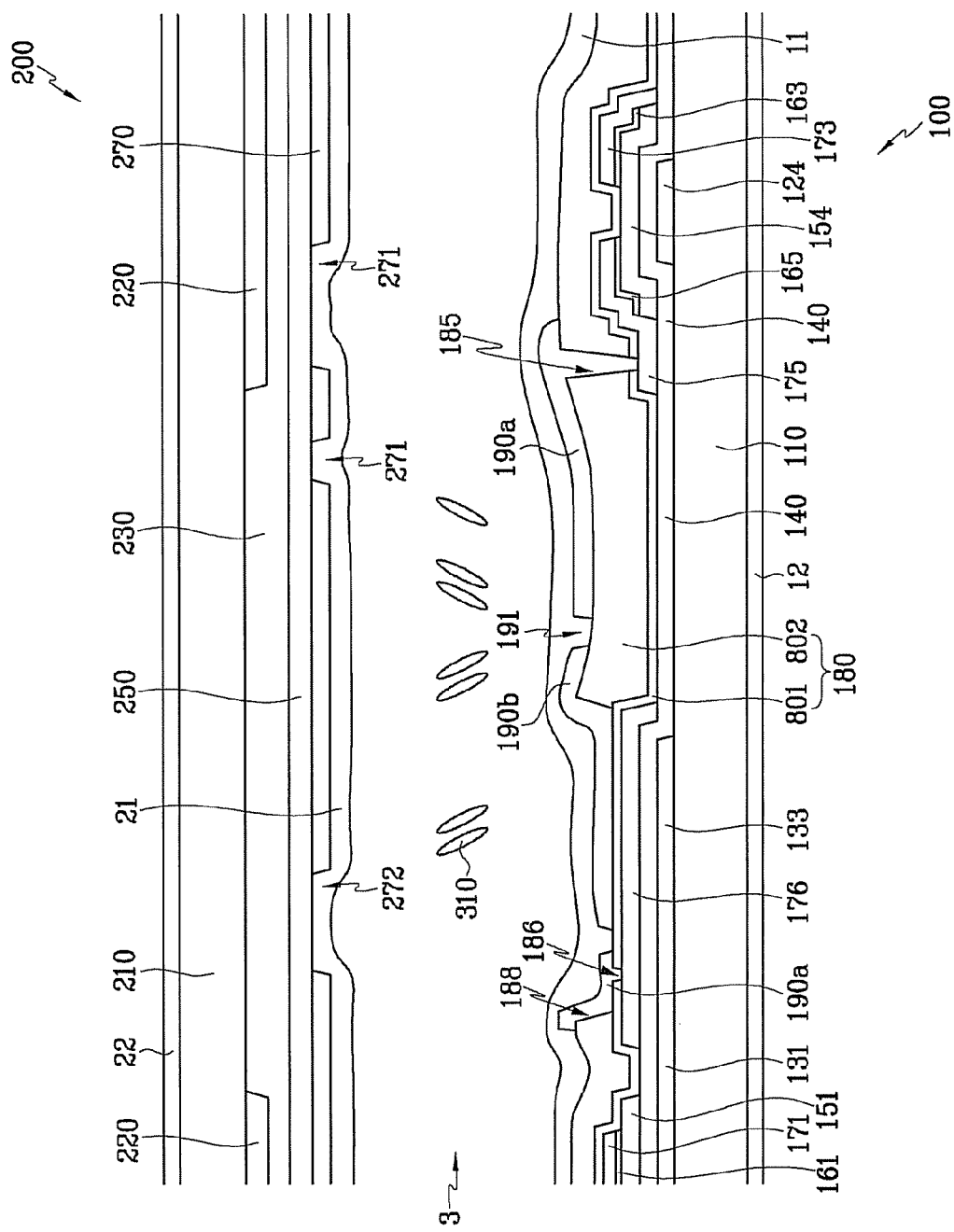
FIG. 10 shows a cross sectional view of IV-IV' of the FIG. 9.

Other embodiments are possible by changing some portions of the above embodiment as follows. If the capacitance $C_{cp}$ is big enough even if the capacitance $C_{cp}$ includes the second passivation layer 802, the coupling capacitance may include the second passivation layer 802. Instead of using a vertical alignment layer, using a homogeneous alignment layer can be another embodiment of the present invention to align LC molecules parallel to the surface. Though the coupling electrode 176 is separated from the drain electrode 175 in the above embodiment, the coupling electrode may be connected to the drain electrode directly with the same layer. Though a storage electrode line is provided separately in the above embodiment, a data line or a gate line may be used instead of the storage electrode line to form a storage capacitor. Two sub pixel electrodes are shown in the present embodiment. Three or more sub pixel electrodes may be formed so that three or more different voltage may be applied to a pixel area. FIG. 6 shows a case that three different voltages are applied to a pixel area. The gamma curve of the inclined view is closer to the front view gamma curve than those of FIG. 4B.

The upper substrate 200 comprises an insulation plate 210. The insulation plate 210 is made of a transparent material like glass, crystal, etc. A black matrix pattern 220 is formed on the insulation plate 210. A color filter layer 230 is fowled on the black matrix pattern 220. The color filter layer 230 may be red, green, or blue. A common electrode 270 is formed on the color filter layer 230 with a planarizing layer 250 therebetween. The common electrode 270 is made of a transparent conductor like indium tin oxide (ITO), indium zinc oxide (IZO), etc. Opening patterns 271, 272, and 273 are formed in the common electrode 270. The black matrix 220 may overlap the opening patterns. The black matrix may block light leakage at the opening pattern areas.

The opening area 191 is between the opening patterns 271 and 272 in a plan view. The opening area 193 is between the opening patterns 272 and 273 in a plan view. The end portions of the opening patterns 271, 272, and 273 are bent and substantially parallel to a side of the pixel electrode 190 respectively. The end portions of the opening patterns 271, 272, and 273 overlap with a portion of the pixel electrode 190 respectively. One end of the each opening pattern 271, 272, and 273 extends longitudinally; another end of the each opening pattern 271, 272, and 273 extends transversely.

The opening patterns 271, 272, and 273 define LC domains by generating fringe field when a voltage is applied to the electrode. The opening patterns 271, 272, and 273 may have notches. The notches may be concave or convex. The notches may have a V shape, a circular shape, or a polygonal shape. The notches may define inclining directions of the LC molecules 310 in the border of the LC domains. Therefore, the LC molecules in the border of the LC domains may be stable and aligned regularly, which may helpful to narrow the opening patterns so that the transmissivity of the display will be enhanced. One or more notches may be formed on one opening pattern. The concave notches and the convex notches may be formed alternately in the opening patterns. Even though the notches are formed only in the common electrode opening patterns of the present embodiment, notches may be formed in the openings 191, 192, and 193. Therefore the notches may be formed one of the common electrode and pixel electrode. The notches may be formed in both the pixel electrode and the common electrode.

The present embodiment of the invention comprises the array substrate, the upper substrate, and an LC layer confined between the array substrate and the upper substrate when the two substrates are assembled together. The openings of the common electrode divide the first pixel electrode 190*a* and the second pixel electrode 190*b* into more than one sub area respectively when the two substrates are assembled. As shown in the FIG. 9, the first pixel electrode 190*a* and the second pixel electrode 190*b* are divided into four sub areas respectively in the present embodiment. The LC molecules in a sub area incline substantially in one direction when an electric field is applied to the LC layer, which is called as an LC domain.

A voltage is applied to the first pixel electrode 190*a* through a transistor. A voltage is applied to the second pixel electrode 190*b* via the coupling capacitance $C_{cp}$. Therefore the voltage difference between the first pixel electrode 190*a* and the common electrode 270 is always bigger than the voltage difference between the second pixel electrode 190*b* and the common electrode 270. The gamma curve of the first pixel electrode area is different from the gamma curve of the second pixel electrode area. Because two different gamma curves exist in one pixel area, the gamma curve of the whole pixel area does not deviate much from one viewing direction to another, which improves display quality.

Figure 11:
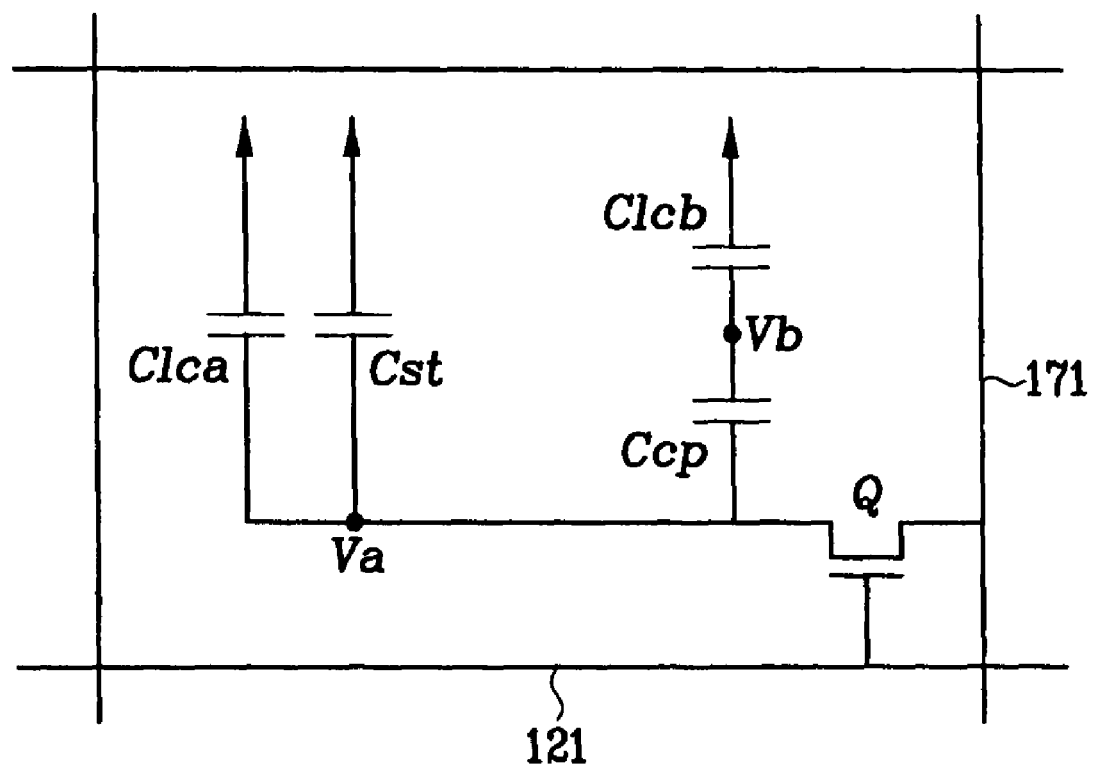
FIG. 11 shows an electric circuit of embodiments of the present invention.
Figure 12A:
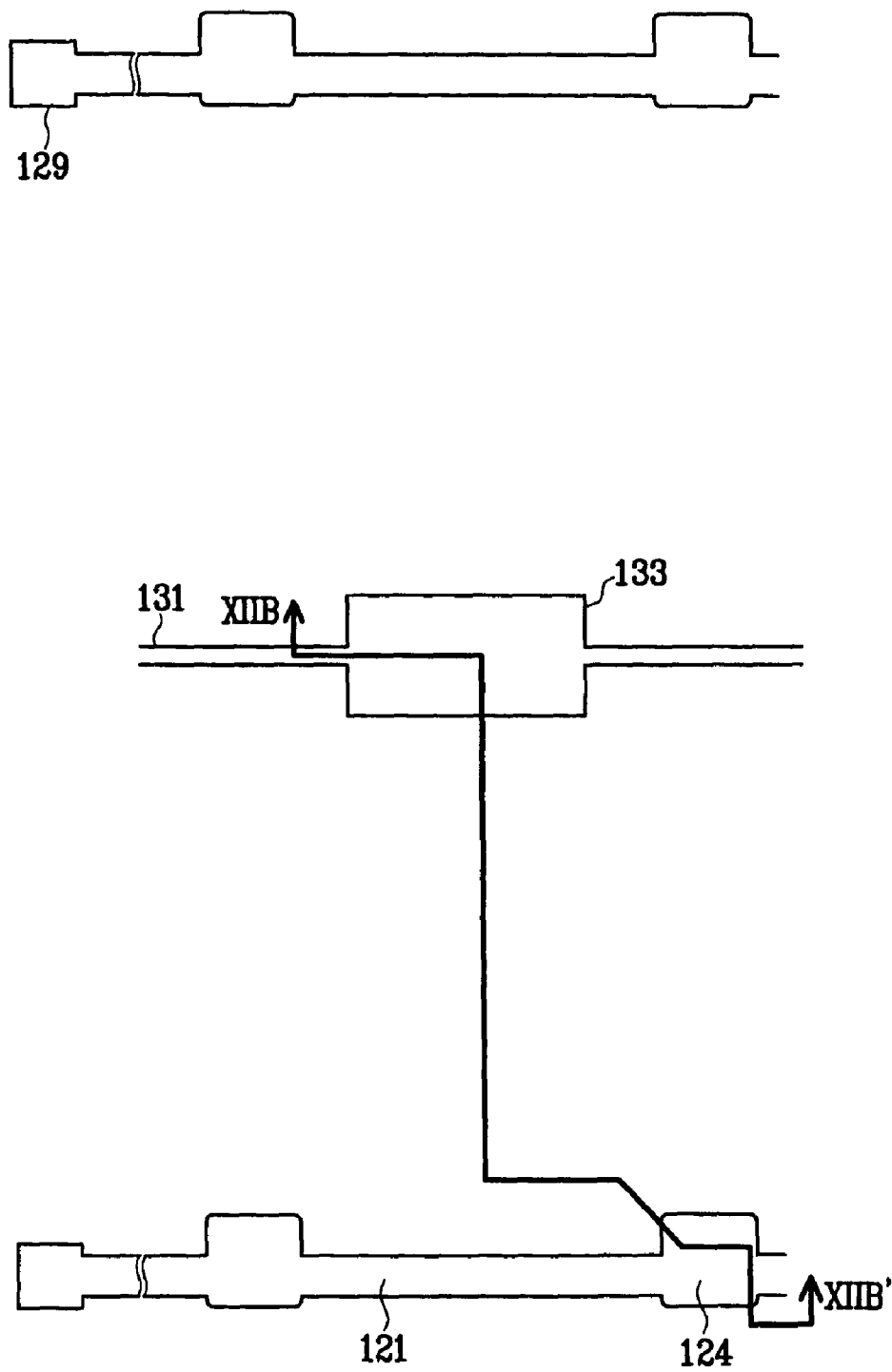
FIGS. 12A, 13A, 14A, and 16A sequentially show steps of a manufacturing method of an embodiment of the present invention.
Figure 12B:
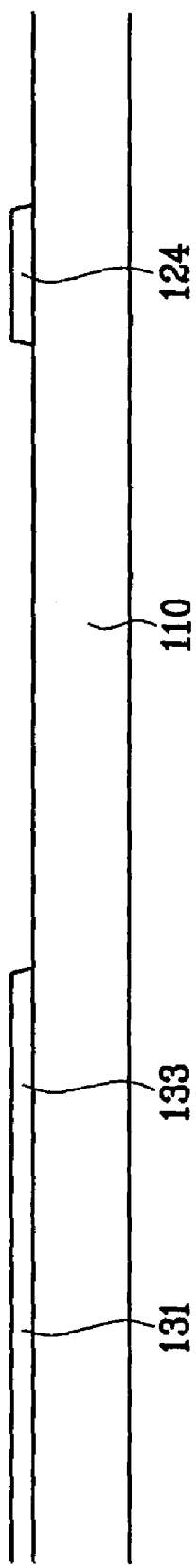
FIG. 12B shows a cross sectional view of VIb-VIb' of the FIG. 12A.
Figure 13A:
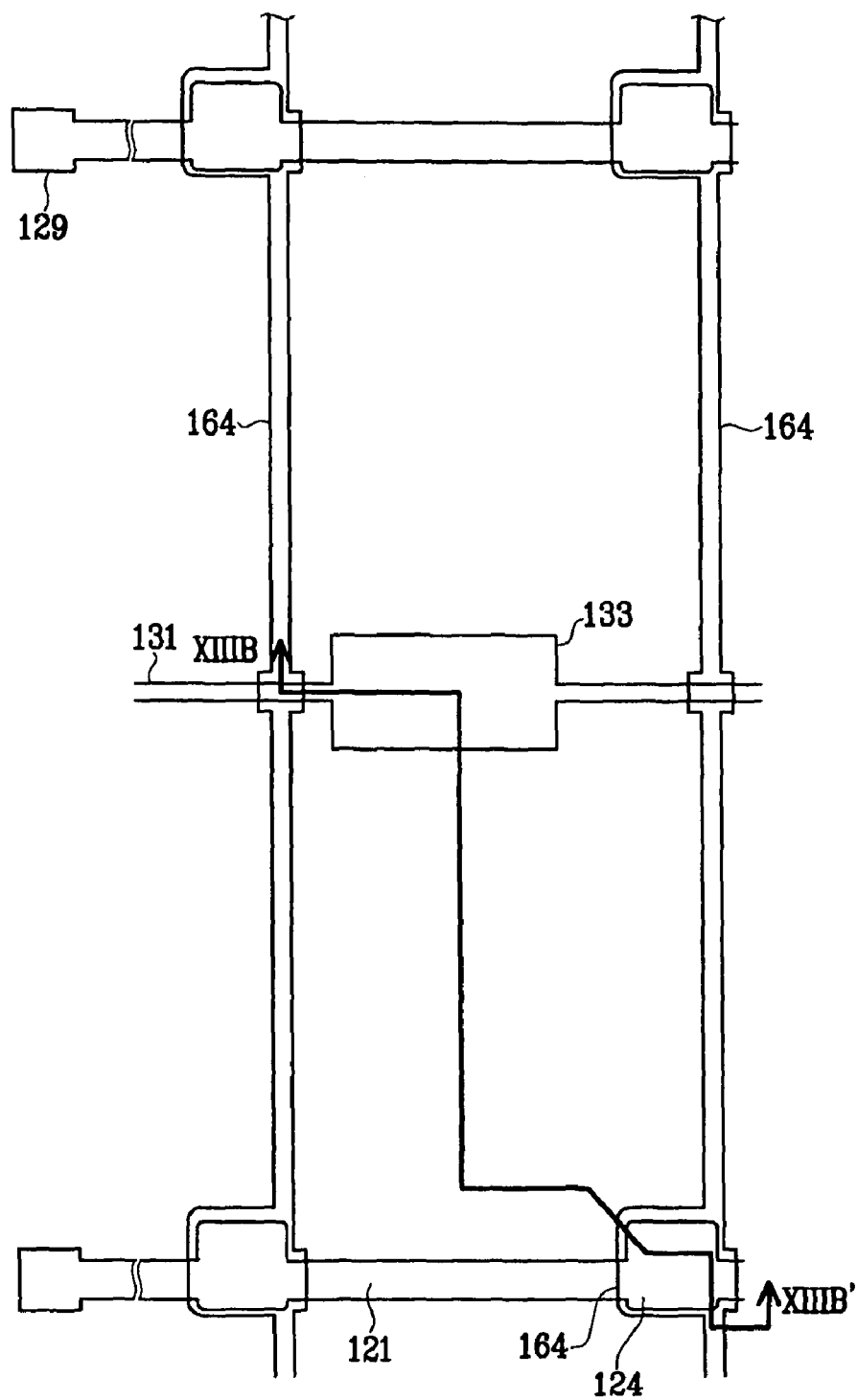
Figure 13B:
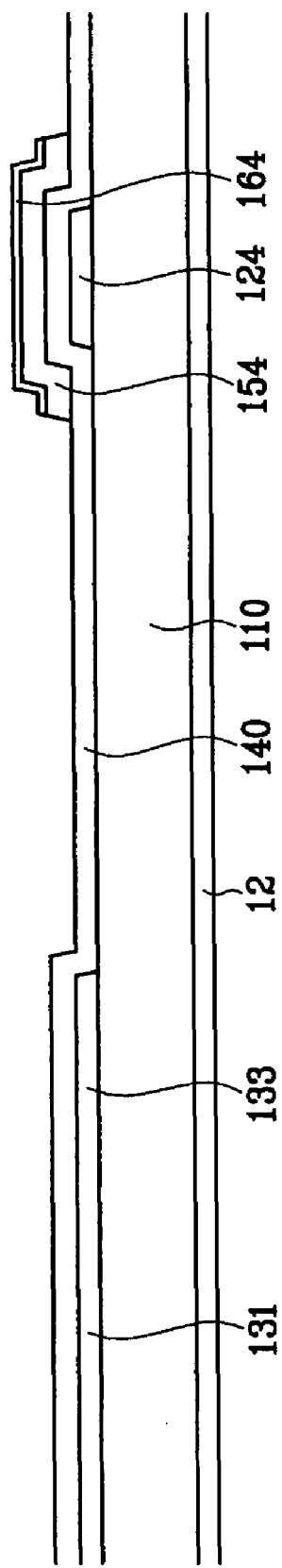
FIG. 13B shows a cross sectional view of VIIb-VIIb' of the FIG. 13A.
Figure 14A:
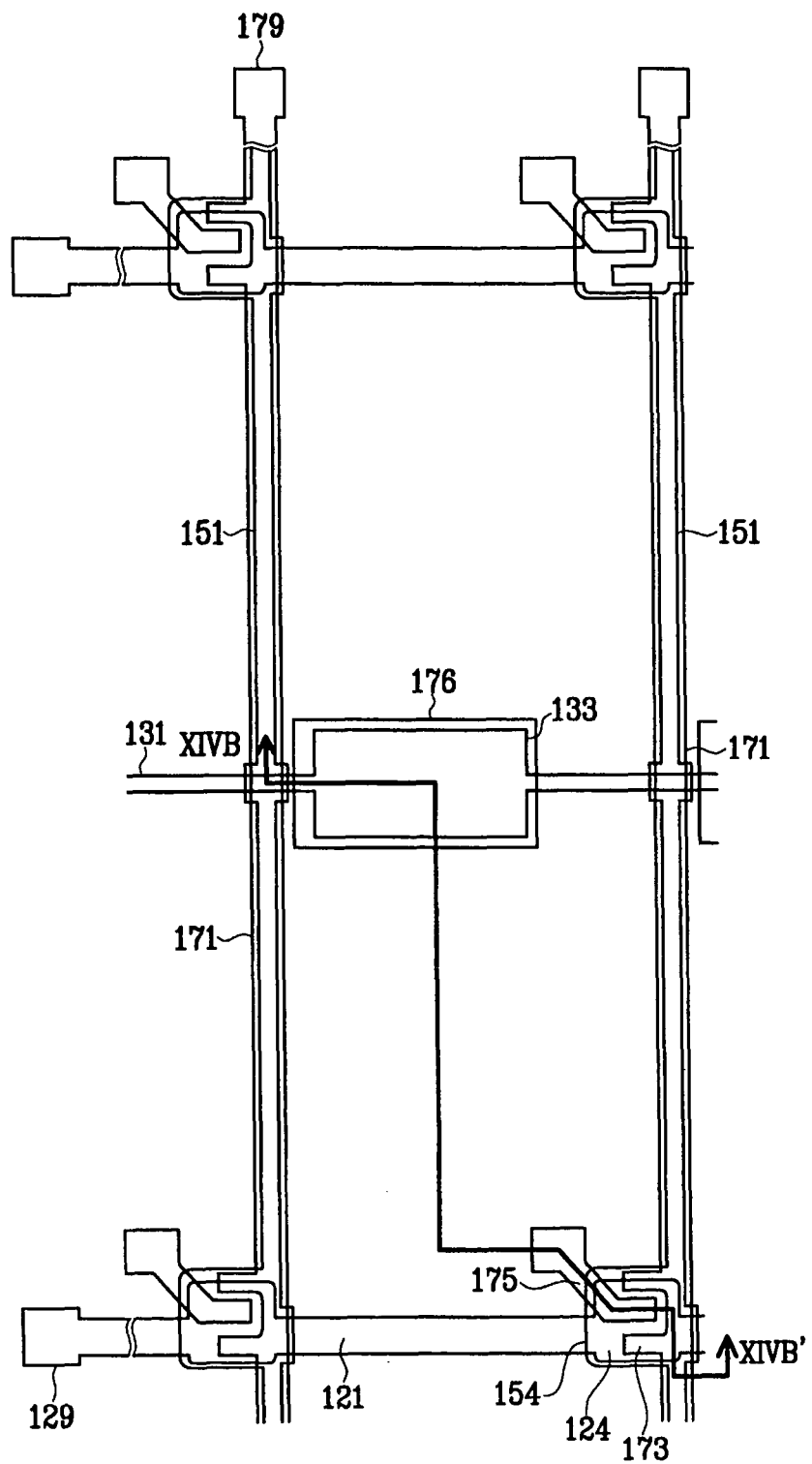
Figure 14B:
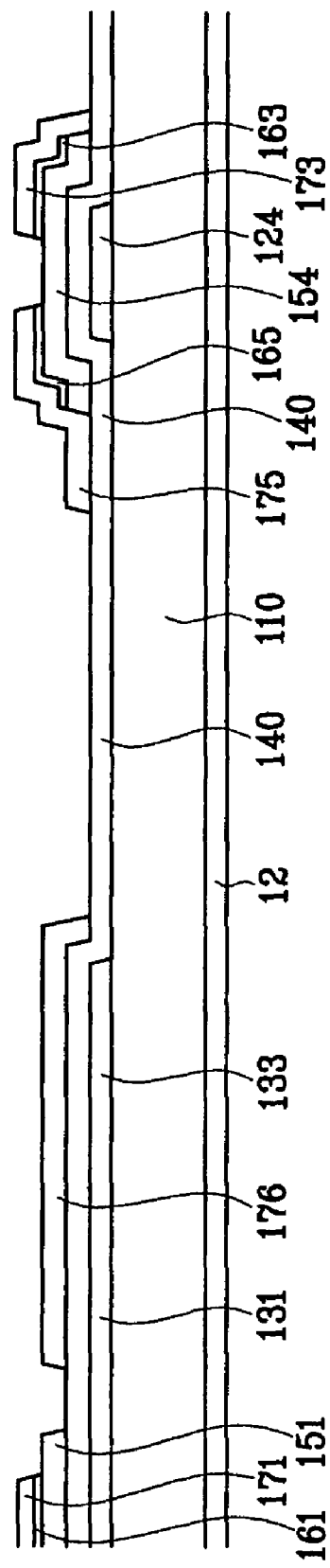
FIG. 14B shows a cross sectional view of VIIIb-VIIIb' of the FIG. 14A.
Figure 15:
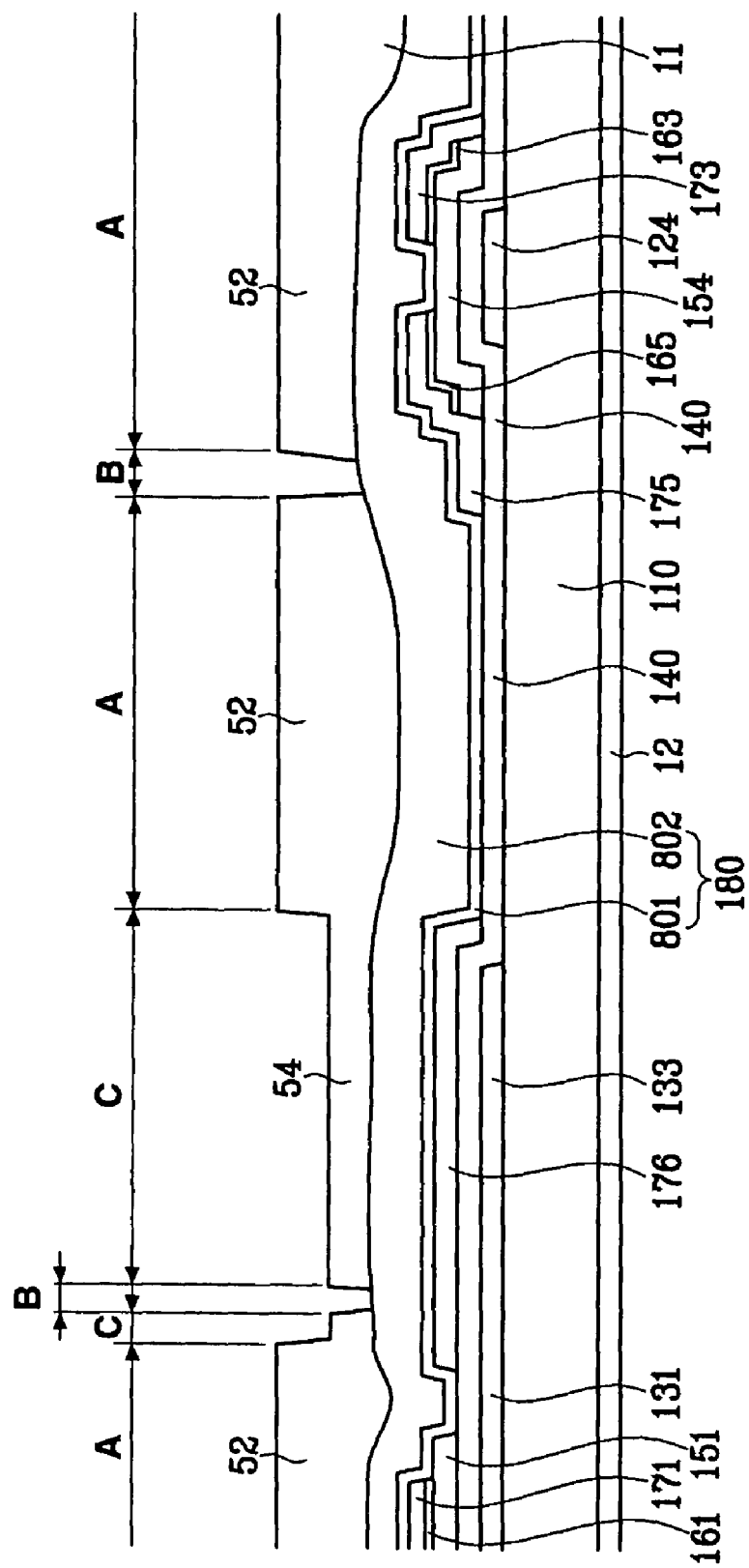
FIG. 15 shows a cross sectional view of VIIIb-VIIIb' of the FIG. 14A in a following step of FIG. 14B.
Figure 16A:
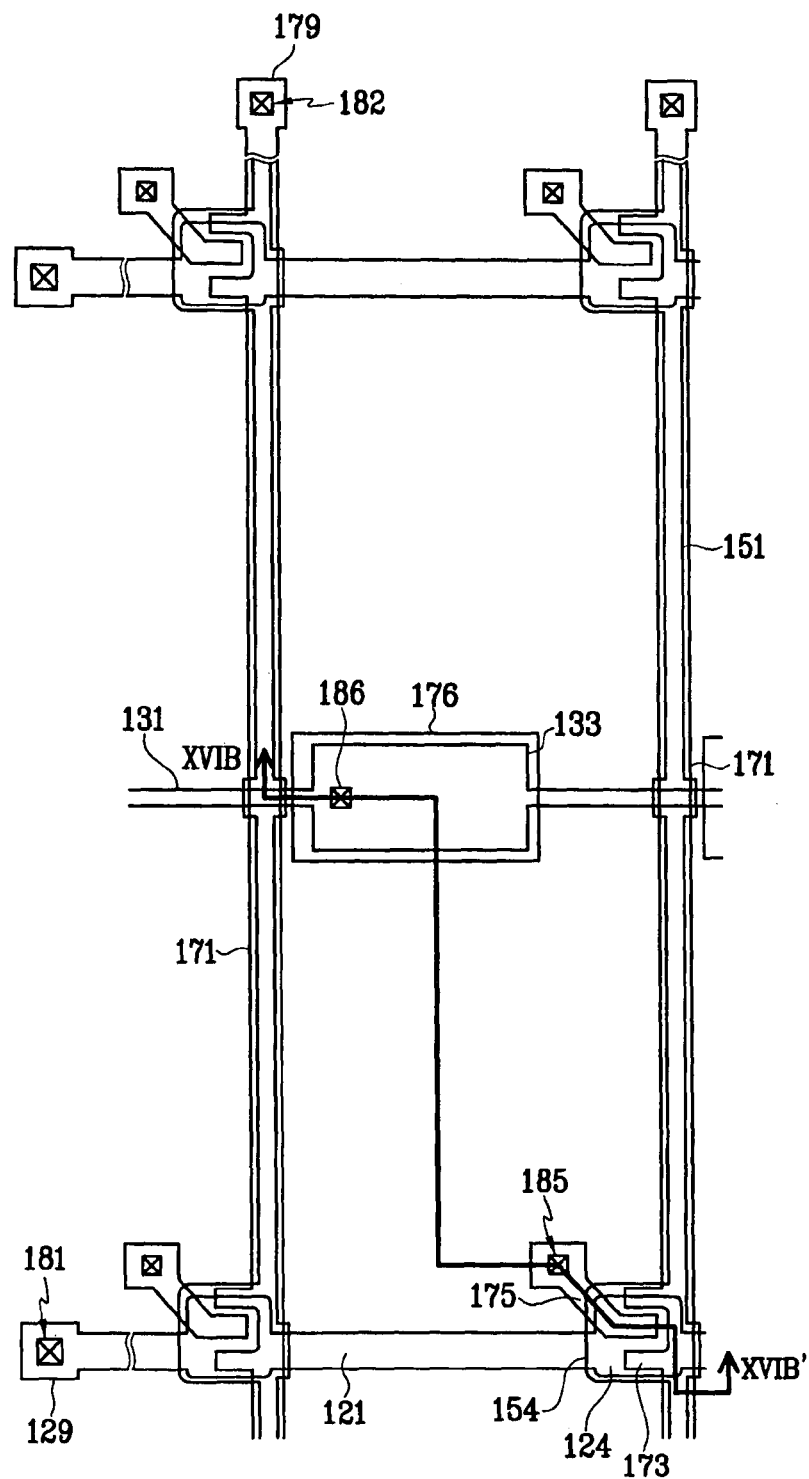
Figure 16B:
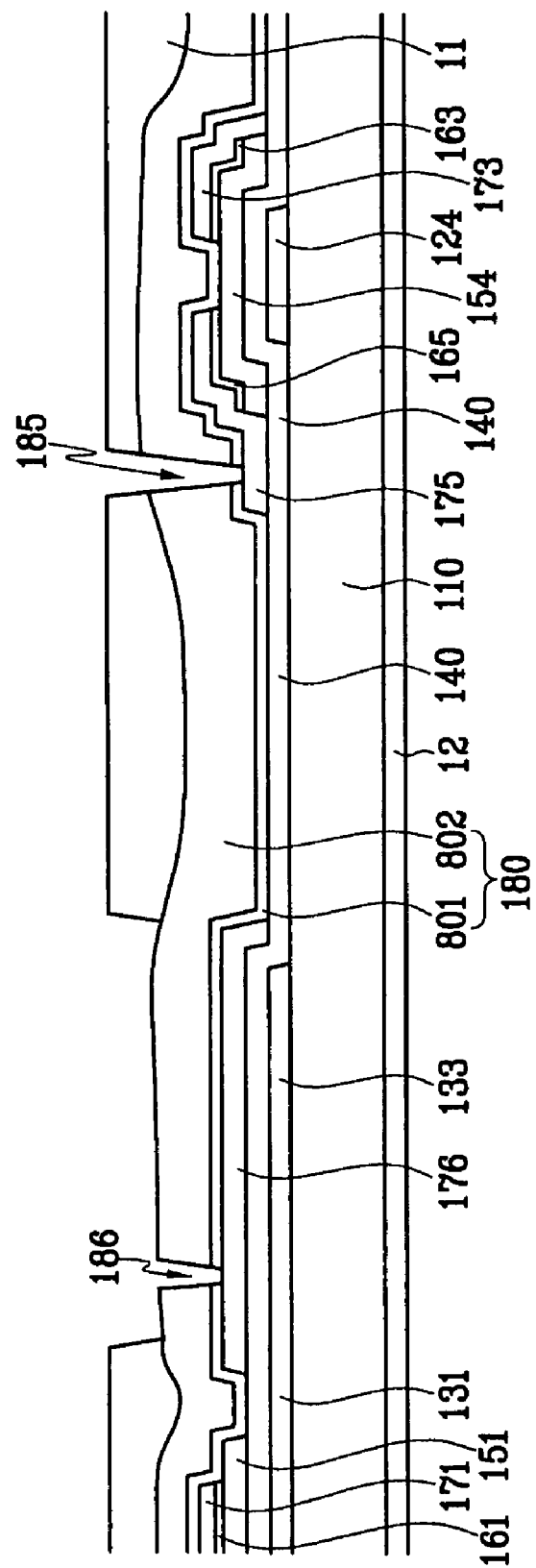
FIG. 16B shows a cross sectional view of Xb-Xb' of the FIG. 16A.
Figure 17:
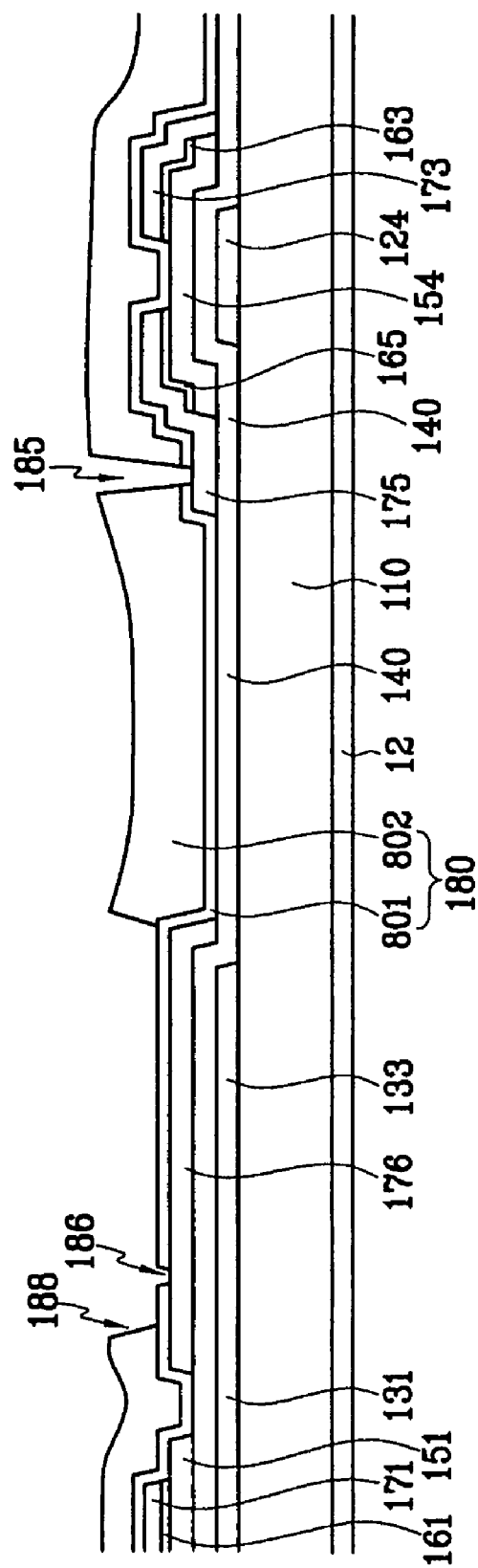
FIG. 17 shows a cross sectional view of Xb-Xb' of the FIG. 16A in a following step of FIG. 16B.
Figure 18:
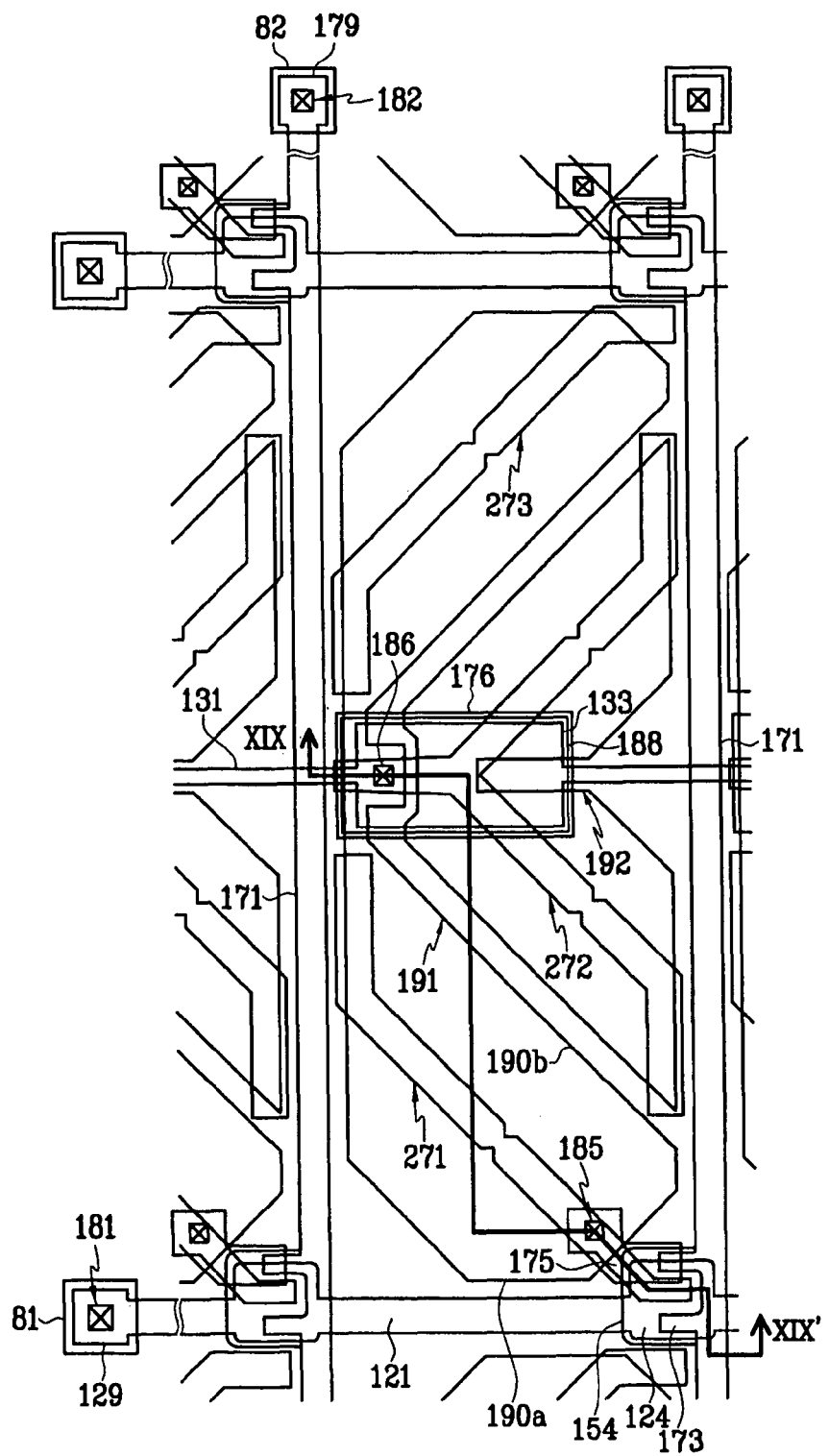
FIG. 18 shows a plan view of an LCD of still another embodiment of the present invention.

The reason why the voltage of the second pixel electrode 190*b* varies from the voltage of the first pixel electrode 190*a* is described hereinafter with reference to FIG. 11. $C_{lca}$ is the capacitance between the common electrode 270 and the first pixel electrode 190*a*. $C_{lcb}$ is the capacitance between the common electrode 270 and the second pixel electrode 190*b*. $C_{st}$ is the capacitance between the storage electrode 131 and the first pixel electrode 190*a* (or the coupling electrode 176). $C_{cp}$ is the capacitance between the second pixel electrode 190*b* and the coupling electrode 176. $V_a$ is the voltage difference between the first pixel electrode 190*a* and the common electrode 270. $V_b$ is the voltage difference between the second pixel electrode 190*b* and the common electrode 270.

$$V_b = V_a \times [C_{cp}/(C_{cp}+C_{lcb})]$$

Wherein $C_{cp}/(C_{cp}+C_{lcb})$ is always less than 1. Therefore, $V_b$ is always less than $V_a$. $V_b$ is good to be from about 50% to about 90% of $V_a$. The lower $V_b$ keeps the gamma curves closer to each other. The lower $V_b$, however, lowers the transmittance of the display. Therefore, $V_b$ should be optimized. The display quality also depends on the ratio of the first pixel size and the second pixel size. If the second pixel size is similar to the first pixel size, $V_b$ is good to be from about 60% to about 75% of $V_a$. If the second pixel is about 1.5 times larger than the first pixel, $V_b$ is good to be from about 65% to about 80% of $V_a$. The other ratio of the pixel size and the ratio of voltages can be calculated in a similar way to the above decided example.

On the other hand, the ratio $V_b$ with respect to $V_a$ can be determined by $C_{cp}$. $C_{cp}$ can be determined by the overlapping dimension of the coupling electrode 176 and the second pixel electrode 190*b* and the distance between the coupling electrode 176 and the second pixel electrode 190*b*. The overlapping dimension depends on the dimension of the coupling electrode 176. The distance may depend on the layer on which the coupling electrode is formed or the second pixel electrode is formed.

A manufacturing method for an embodiment of the present invention is described hereinafter with reference to FIGS. 12A, 12B, 13A, 13B, 14A, 14B, 15, 16A, 16B, 17, 18, and 19.

Two layers of metals are deposited on an insulation plate 110 by sputtering method. The insulation plate 110 is made of a transparent material like glass, quarts, etc. The lower metal layer may have characteristics of good contact with ITO or IZO. The lower metal layer may be made of Mo, Mo alloy, Cr, and etc. The upper metal layer may comprise Al. A gate line 121 having a plurality of gate electrode 124 and a storage electrode line 131 having a plurality of storage electrode 133 are formed of the metal layers by photolithography.

A gate insulation layer, an intrinsic amorphous silicon layer, and an extrinsic amorphous silicon layer are deposited in turn and continuously on the gate line 121 and the storage electrode line 131. A semiconductor pattern including a plurality of lines and a plurality of protrusions on the lines is formed by photolithography. The gate insulation layer may be made of silicon nitride. The gate insulation layer deposition temperature is 250~500° C. The gate insulation layer is 2,000~5,000 Å thick.

A metal layer is deposited on the semiconductor pattern. The metal layer is patterned to form a plurality of data lines including a plurality of source electrodes, a plurality of coupling electrode, and a plurality of drain electrode by photolithography. Then, the exposed portion of the extrinsic semiconductor is removed so that the intrinsic semiconductor 151 is exposed. After that, the intrinsic semiconductor may be treated by oxygen plasma to stabilize the surface of the intrinsic semiconductor layer.

A first passivation layer 801 is deposited on the data metal layer. The first passivation layer 801 is made of an inorganic insulation layer like $SiN_x$. A second passivation layer 802 is deposited on the first passivation layer 801. The second passivation layer 802 is made of an organic material that has lower dielectric constant than the first passivation layer 801. The first passivation layer 801 and the second passivation layer 802 form a passivation layer 180 together. A photo resist layer is coated on the passivation layer 180 by spin coating or slit coating. Photo resist patterns 52 and 54 are formed by photolithography. The photo resist pattern 52 is thicker than the photo resist pattern 54. In the region B, the photo resist layer does not remain. This photo resist pattern can be formed by a photo mask having a translucent area, a transparent area, and a light blocking area. The translucent area may be made of a slit pattern or a lattice pattern. The translucent area may be formed with a thinner layer than the layer of the light blocking area. The translucent pattern may be also made by a material whose transmissivity is about from 20% to about 80%.

The passivation layer 180 is etched by making use of the photo resist (PR) pattern so that a portion of the coupling electrode 121 and a portion of the drain electrode 175 are exposed trough the contact holes 185 and 186. At the same time, the contact holes 181 and 182 exposing the end portion of the data line 171 and the gate line 121 are formed. After that, the portion 54 of the PR pattern is removed by ashing process. During the ashing process, a portion of the PR pattern 52 may be removed because the ashing process affects the whole surface of the substrate. A portion of the PR pattern 52 will still remain even if the whole portion of the PR pattern 54 is removed because the PR pattern 52 is thicker than the PR pattern 54. The second passivation layer 802 in the area C is exposed by the ashing process. The second passivation layer 802 of the area C is removed by an etching. After that, the PR pattern of the area A is removed.

As another embodiment of the present invention, the second passivation layer 802 may be a photosensitive material. In this case, it is not necessary to etch the second passivation layer. The process for forming the second passivation pattern with photosensitive material is similar to the process for forming PR pattern of the above embodiment.

A transparent conductor is deposited on the second passivation layer. The transparent conductor is from about 500 Å to about 1500 Å thick and made of ITO, IZO, or a similar material. The transparent conductor may be formed by sputtering. A plurality of pixel electrodes and contact assistants 81 and 82 are formed by photolithography. In case the transparent conductor is IZO, a Cr etching material like $HNO_3/(NH_4)_2Ce(NO_3)_6/H_2O$, etc may be used for etching IZO. These kinds of etching material do not damage Al so that the Al layer is not damaged in the gate line, the data line, or the drain electrode.

As another embodiment of the present invention, the extrinsic semiconductor pattern is similar to the data line metal layer pattern because the semiconductor pattern is formed after forming the data line metal layer pattern. In this case the data line metal layer pattern includes the coupling electrode, the drain electrode, and the source electrode as well as the data line. The intrinsic semiconductor pattern is also similar to the data line metal layer pattern except the channel area of the TFT.

A method for manufacturing the above embodiment is described hereinafter. Because the other steps for manufacturing the present embodiment is similar to the above mentioned method, only the methods for forming the semiconductor pattern and the data metal layer pattern are described hereinafter. After forming the gate insulation layer, the intrinsic semiconductor layer, the extrinsic semiconductor layer, and the data metal layer continuously, a photo resist pattern is formed on the data metal layer. The TFT channel area of the PR pattern is thinner than the PR pattern of the other area. A similar step to the manufacturing process of the passivation layer 190 may be applied to form a thinner PR pattern. The data metal layer, the extrinsic semiconductor layer, and the intrinsic semiconductor layer are patterned by using the PR pattern as a mask. The PR pattern is ashed to remove the PR remaining at the channel area. A portion of the PR pattern of the other area is still remained because it is thicker than the PR pattern at the channel area. The data metal layer and the extrinsic semiconductor layer at the channel area are removed in turn.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A thin film transistor substrate, comprising:
an insulation plate;
a first signal line formed on the insulation plate and defining a first boundary of a pixel area;
a storage electrode line formed on the insulation plate traversing a middle portion of the pixel area, the storage electrode line comprising a storage electrode having a larger width than the other portion of the storage electrode line;
a gate insulation layer formed on the first signal line and the storage electrode line;
a second signal line formed on the gate insulation layer and insulated from the first signal line and the storage electrode line, the second signal line crossing the first signal line and forming a second boundary of the pixel area;
a coupling electrode formed on the gate insulation layer and fully overlapping the storage electrode;
a thin film transistor comprising:
a first terminal connected to the first signal line;
a second terminal connected to the second signal line; and
a third terminal;
a passivation layer formed on the second signal line, the coupling electrode and the thin film transistor, the passivation layer comprising a first contact hole and a second contact hole;
a first pixel electrode formed on the passivation layer, the first pixel electrode connected to the third terminal of the thin film transistor through the first contact hole and connected to the coupling electrode through the second contact hole; and
a second pixel electrode formed on the passivation layer, the second pixel electrode separated from the first pixel electrode by an opening area and partially overlapped with the coupling electrode, the opening area comprising:
a first portion having an upper part and a lower part, the upper part located in a pixel area above the storage electrode line and extending in a first diagonal direction from the storage electrode line, the lower part located in a pixel area below the storage electrode line and extending in a second diagonal direction from the storage electrode line; and
a second portion substantially orthogonal with the storage electrode line and substantially fully overlapped with the storage electrode,
wherein the first pixel electrode and the second pixel electrode are alternately arranged along a direction of the first signal line, and the coupling electrode overlaps the second portion of the opening area.

2. The thin film transistor substrate of claim 1, wherein the storage electrode forms storage capacitance with the coupling electrode.

3. A thin film transistor substrate comprising:
an insulation plate;
a first signal line formed on the insulation plate and defining a first boundary of a pixel area;
a storage electrode line formed on the insulation plate traversing a middle portion of the pixel area, the storage electrode line comprising a storage electrode having a larger width than the other portion of the storage electrode line;
a gate insulation layer formed on the first signal line and the storage electrode line;
a second signal line formed on the gate insulation layer and insulated from the first signal line and the storage electrode line, the second signal line crossing the first signal line and forming a second boundary of the pixel area;
a coupling electrode formed on the gate insulation layer and located in the middle portion of the pixel area; the bigger one of the coupling electrode and the storage electrode fully overlapping the other one;
a thin film transistor comprising:
a first terminal connected to the first signal line;
a second terminal connected to the second signal line; and
a third terminal;
a passivation layer formed on the second signal line, the coupling electrode and the thin film transistor, the passivation layer comprising a first contact hole and a second contact hole;
a first pixel electrode formed on the passivation layer, the first pixel electrode, connected to the third terminal of the thin film transistor through the first contact hole and connected to the coupling electrode through the second contact hole; and
a second pixel electrode formed on the passivation layer, the second pixel electrode separated from the first pixel electrode by an opening area and partially overlapped with the coupling electrode, the opening area comprising:
a first portion having an upper part and a lower part, the upper part located in a pixel area above the storage electrode line and extending in a first diagonal direction from the storage electrode line, the lower part located in a pixel area below the storage electrode line and extending in a second diagonal direction from the storage electrode; and
a second portion substantially fully overlapped with the storage electrode,
wherein the first pixel electrode and the second pixel electrode are alternately arranged along a direction of the first signal line, and the coupling electrode overlaps the second portion of the opening area.

4. The thin film transistor substrate of claim 3,
wherein the storage electrode forms storage capacitance with the coupling electrode.

5. The thin film transistor substrate of claim 3,
wherein the second portion forms substantially an angle of about 90 degrees with the first signal line.

* * * * *